United States Patent
Laing et al.

(10) Patent No.: US 8,874,692 B2
(45) Date of Patent: Oct. 28, 2014

(54) METHOD AND APPARATUS FOR ORGANIZING INFORMATION IN A WORLD WIDE WEB PAGE FORMAT

(75) Inventors: Barbara Laing, Colts Neck, NJ (US); Aleksey Ivanov, Atlantic Highlands, NJ (US); Robert Leighty, Columbus, OH (US); Alice Taylor, Greentown, PA (US); Carey J. Joseph, Howell, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1081 days.

(21) Appl. No.: 11/389,817

(22) Filed: Mar. 27, 2006

(65) Prior Publication Data

US 2007/0226369 A1 Sep. 27, 2007

(51) Int. Cl.
*G06F 15/16* (2006.01)
*G06F 17/30* (2006.01)

(52) U.S. Cl.
CPC ...... *G06F 17/3089* (2013.01); *G06F 17/30896* (2013.01); *G06F 17/30893* (2013.01)
USPC ........... 709/219; 709/217; 709/218; 709/227; 709/231; 709/246; 707/E17.116; 707/E17.117; 707/E17.118; 715/205; 715/234; 715/243

(58) Field of Classification Search
CPC .......... G06F 17/3089; G06F 17/30893; G06F 17/30896
USPC .................. 709/203, 217–219, 27, 231, 246; 715/234, 243, 200–208; 707/E17.116–E17.118
See application file for complete search history.

(56) References Cited

U.S. PATENT DOCUMENTS

| | | | | | |
|---|---|---|---|---|---|
| 5,845,299 | A | * | 12/1998 | Arora et al. | 715/209 |
| 5,956,736 | A | * | 9/1999 | Hanson et al. | 715/234 |
| 6,026,433 | A | * | 2/2000 | D'Arlach et al. | 709/203 |
| 6,684,369 | B1 | | 1/2004 | Bernardo | |
| 6,701,343 | B1 | | 3/2004 | Kenyon | |
| 2004/0123238 | A1 | * | 6/2004 | Hefetz et al. | 715/513 |

FOREIGN PATENT DOCUMENTS

EP 1338987 A 8/2003

OTHER PUBLICATIONS

PCT Search Report and Written Opinion from PCT/US2007/064826, consists of 12 unnumbered pages.

* cited by examiner

*Primary Examiner* — Thomas Dailey
*Assistant Examiner* — Nam Tran

(57) ABSTRACT

In one embodiment, the present invention is a method and apparatus for organizing information in a world wide web page format. In one embodiment, information is received from a user (e.g., via a graphical user interface) and transformed into a world wide web page. The world wide web page is displayed to the user as the information is received (e.g., in substantially real time), so that the user can view the world wide web page as he or she constructs it. The invention therefore requires little to know prior programming knowledge.

14 Claims, 2 Drawing Sheets

METHOD AND APPARATUS FOR ORGANIZING INFORMATION IN A WORLD WIDE WEB PAGE FORMAT

FIELD OF THE INVENTION

The present invention relates generally to content management and relates more particularly to the creation of world wide web pages.

BACKGROUND OF THE INVENTION

The World Wide Web has become one of the primary tools for exchange of information in today's society, in part do to the ease in disseminating and retrieving information made available thereover. Many industries and entities have exploited this fact, making masses of information available through both public and private web sites.

In many instances, the information made available by a single entity over the World Wide Web is not organized in any coherent fashion, thus increasing the potential for redundancy in the information provided. That is, the entity may end up unintentionally providing the same information and files via multiple web sites and servers. The extraneous web sites, web servers and web masters required to maintain this redundant information unnecessarily increases the costs associated with making the information available.

Thus, there is a need in the art for a method and apparatus for organizing information in an Internet web page format.

SUMMARY OF THE INVENTION

In one embodiment, the present invention is a method and apparatus for organizing information in a world wide web page format. In one embodiment, information is received from a user (e.g., via a graphical user interface) and transformed into a world wide web page. The world wide web page is displayed to the user as the information is received (e.g., in substantially real time), so that the user can view the world wide web page as he or she constructs it. The invention therefore requires little to know prior programming knowledge.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to the organization of information in a world wide web page format. Embodiments of the invention allow users (e.g., web masters, customers, end users, etc.) to enter information into a pre-architected web page or template. The pre-architected web page is constructed to present the customized information in an organized fashion, thereby reducing the potential for disseminating redundant information.

Figure 1:
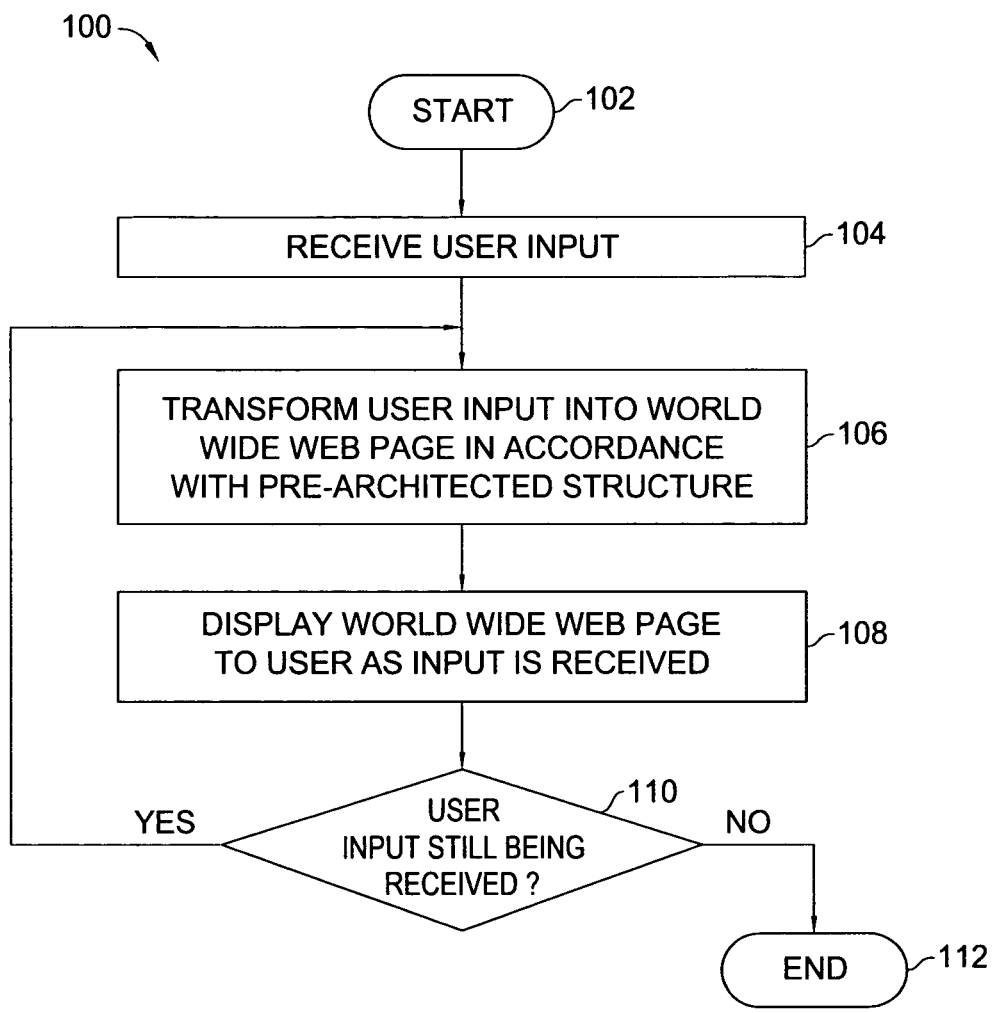
FIG. 1 is a flow diagram illustrating one embodiment of a method for organizing information in a world wide web page format.

FIG. 1 is a flow diagram illustrating one embodiment of a method 100 for organizing information in a world wide web page format. The method 100 may be implemented, for example, by a novice user (e.g., an individual with little or no knowledge of programming languages such as hypertext markup language (HTML)) in order to build world wide web page with which to convey information in an organized manner.

The method 100 is initialized at step 102 and proceeds to step 104, where the method 100 receives user input. The user input comprises the information that the user wishes to convey through the world wide web site. For example, in one embodiment, the user input includes at least one of the following: text information, graphics, hyperlinks, file attachments, data feeds (e.g., for news, stocks, etc.), administrative settings (e.g., which other users or groups of users are permitted to view and/or edit certain portions of the completed world wide web page), HTML code and data cut and pasted from an HTML editor. In one embodiment, the user input is received via a graphical user interface that is displayed as a pre-architected world wide web page template. In one embodiment (e.g., where the user is creating a new world wide web page), the template is essentially a blank or "empty" web page having one or more alterable "cosmetic" features set (e.g., section layout, colors, etc.) but little or no substantive content (e.g., information that the user wishes to convey). In another embodiment (e.g., where the user is modifying an existing world wide web page), the template includes at least some alterable substantive content (e.g., previously entered by the user or another individual) in addition to the alterable cosmetic features. Thus, the template "looks" like a published world wide web page (with or without substantive content, and with mechanisms for adding substantive content), as opposed to looking, for example, like a plurality of unpublished input fields or tools.

In one embodiment, the template is customizable to the needs or specifications of the user (e.g., the types and arrangements of input fields are customizable). In one embodiment, the template includes at least one of: drop-down menus (e.g., for selecting from among a group of predefined options), input fields (e.g., for inputting textual, graphical, attachment or hyperlink data), search tools (e.g., for searching for substantive content to add or link to the world wide web page), an event calendar (e.g., for scheduling meetings and other events), an administrator tool (e.g., for controlling viewing and editing access) and a mechanism for adding one or more "sub-portals" or hyperlinks to secondary world wide web pages. In one embodiment, the template further includes one or more mechanisms such as buttons that allow the user to alter the layout of the world wide web page (e.g., by adding, deleting or moving sections of the world wide web page).

In one embodiment, the drop-down menus allow the user to select an option from among a plurality of predefined options. A drop-down menu (or other formatted menu structure) may be used, for example, to allow a user to select a background color of the world wide web page or a title bar. In one embodiment, the input fields allow the user to add substantive content, for example in the form of text, code (e.g., HTML), images or hyperlinks. In one embodiment, the event calendar includes one or more fields (e.g., arranged in a calendar format) that allow a user to enter information about a scheduled event and/or to attach or post documents or hyperlinks (e.g., reports for use in a scheduled meeting). In one embodiment the administrator tool enables a user to specify which other users or groups of users are permitted to view and/or modify certain portions (e.g., certain posted documents, news feeds, calendar entries, etc.) of the world wide web page. In one embodiment, the administrator tool may be in the form of a drop-down menu. In one embodiment, the search tools include at least one of: a tool for searching documents (e.g., documents available for upload into the template), a tool for searching news stories and a tool for searching the Internet.

In one embodiment, the template also allows a user to add one or more viewer search tools for use by viewers of the world wide web page (e.g., tools for searching uploaded documents, news stores, the Internet, etc.). In a further embodiment, the operation of the viewer search tool(s) is restricted by administrator tool settings (i.e., if a given user or group of users is not enabled to access certain data, this data will not be included in the search results produced by the search tool(s)).

In step 106, the method 100 transforms the user input into a world wide web page, in accordance with the pre-architected template structure. That is, the user input is imported into the template structure so that the world wide web page will have substantially the same structure as the template, but the fields of the world wide web page will be populated with the user-specific data input by the user. In one embodiment, the user input is not applied to the world wide web page until a signal is received from the user indicating that the input is ready to be applied (e.g., the user is done entering input). For example, the user may provide information using one of the input modalities described above, and then click a button on the graphical user interface to "enter" the information.

In step 108, the method 100 displays the world wide web page to the user in publishable form, as the input is received. That is, the method 100 displays the world wide web page, as it would look if published immediately, to the user in substantially real time (e.g., substantially instantaneously), so that the user can see what the "finished" world wide web page looks like as he or she provides the data to be included therein (i.e., "see as you go"). Thus, in one embodiment, the template provided by the method 100 contains "what you see is what you get" (wysiwyg) HTML capability.

In step 110, the method 100 determines whether user input is still being received. In one embodiment, a user may indicate that no more input is forthcoming by sending a signal to the method 100 (e.g., by clicking a button on the template or logging out). If the method 100 concludes in step 110 that user input is still being received, the method 100 returns to step 106 and proceeds as described above to transform the user input into a displayable world wide web page in substantially real time. Alternatively, if the method 100 concludes in step 110 that no more user input is being received, the method 100 terminates in step 112. The world wide web page is thus finalized, at least for the time being.

The method 100 thereby allows a user to import customized, user-specific information into a pre-architected world wide web page structure. This enables even users that have little or no previous programming knowledge to create customized world-wide web pages for organizing information (e.g., at the level of a program or project). Moreover, the method 100 allows the user to view the world wide web page as the information is being provided, so that the user can see what the current version of the "finished" product will look like. In addition, the method 100 enables "on the fly" modification of substantially any feature of the world wide web page (e.g., title, colors, content, etc.). Thus, the user is able to easily assess the actual (i.e., viewable) state of the world wide web page and determine whether changes are necessary before publishing the world wide web page for others to view.

Figure 2:
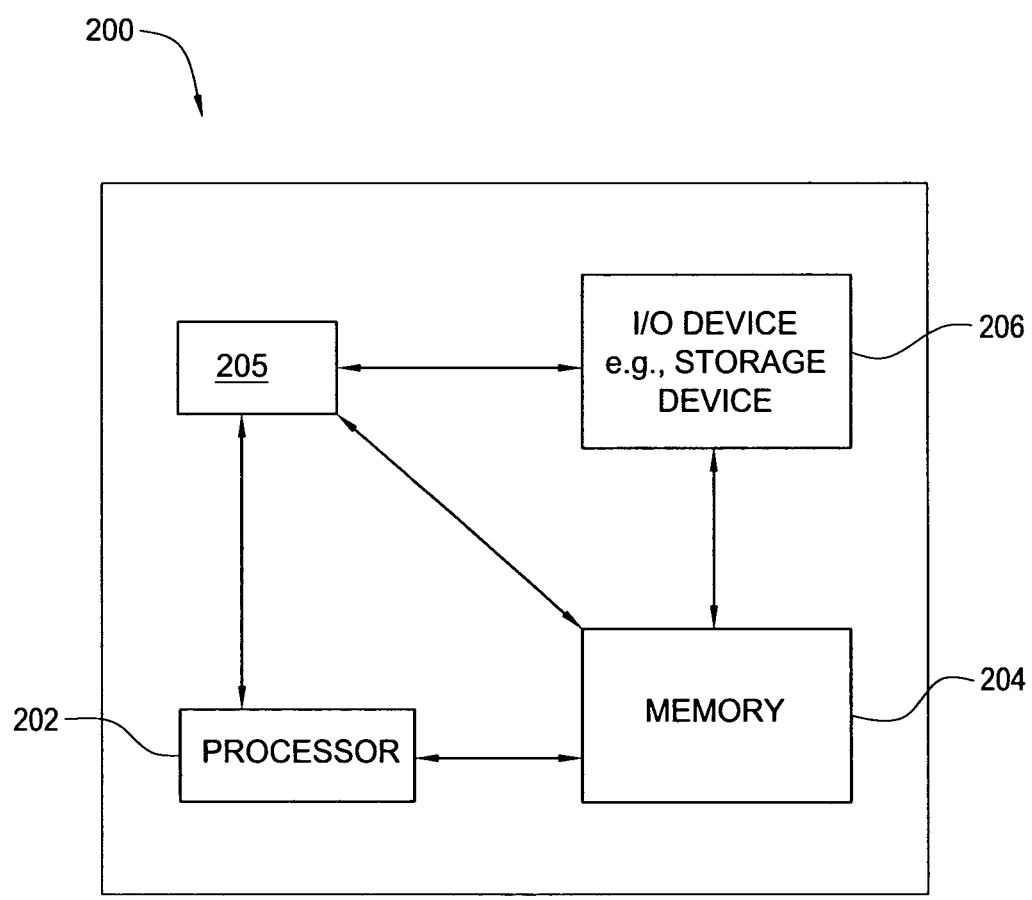
FIG. 2 is a high level block diagram of the information organization method that is implemented using a general purpose computing device.

FIG. 2 is a high level block diagram of the information organization method that is implemented using a general purpose computing device 200. In one embodiment, a general purpose computing device 200 comprises a processor 202, a memory 204, an information organization module 205 and various input/output (I/O) devices 206 such as a display, a keyboard, a mouse, a modem, and the like. In one embodiment, at least one I/O device is a storage device (e.g., a disk drive, an optical disk drive, a floppy disk drive). It should be understood that the information organization module 205 can be implemented as a physical device or subsystem that is coupled to a processor through a communication channel.

Alternatively, the information organization module 205 can be represented by one or more software applications (or even a combination of software and hardware, e.g., using Application Specific Integrated Circuits (ASIC)), where the software is loaded from a storage medium (e.g., I/O devices 206) and operated by the processor 202 in the memory 204 of the general purpose computing device 200. Thus, in one embodiment, the information organization module 205 for organizing user input in a world wide web page format described herein with reference to the preceding Figures can be stored on a computer readable medium or carrier (e.g., RAM, magnetic or optical drive or diskette, and the like).

Thus, the present invention represents a significant advancement in the field of content management. Users (e.g., webmasters, customers, end users, etc.) are enabled to import customized, user-specific information into a pre-architected world wide web page structure. This enables even users that have little or no previous programming knowledge to create customized world wide web pages for organizing information. Moreover, users are enabled to view the world wide web page as the information is being provided, so that the user can see what the current version of the "finished" product will look like (e.g., there is no need to switch between multiple pages for entering and viewing the information). In addition, the present invention allows users to modify substantially any feature of the world wide web page "on the fly". Thus, the user is able to intuitively assess the actual state of the world wide web page and determine whether changes are necessary before publishing the world wide web page for others to view.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for displaying a world wide web page, the method comprising:

receiving via a processor the information from a user, wherein the information is to be displayed in the world wide web page, wherein the information includes a data feed from a source other than the user, wherein the information is received via a graphical user interface organized as a pre-architected world wide web page template;

transforming via the processor the information into the world wide web page immediately upon completion of an entry of the information by the user, wherein the transforming imports the information into a template structure of the pre-architected world wide web page template; and displaying via the processor the world wide web page including the information to the user in a publishable form as the information is received, wherein the displaying is performed in real time, wherein the transforming and the displaying do not require an additional input from the user beyond the information that is received, wherein the publishable form provides a view of the world wide web page as finished, wherein the view of the world wide web page as finished comprises a view of the template structure of the pre-architected world wide web page template with fields of the pre-architected world wide web page template populated with the information, wherein the data feed from the source other that the user is continuously displayed in real time.

2. The method of claim 1, wherein the template is customized to a specification of the user.

3. The method of claim 1, wherein the template includes a hyperlink to a secondary world wide web page.

4. The method of claim 1, wherein the template structure is defined by the template.

5. The method of claim 1, wherein the information includes a hyperlink.

6. The method of claim 1, wherein the information includes a file attachment.

7. The method of claim 1, wherein the information includes a menu selection.

8. The method of claim 1, wherein the information includes an image.

9. A non-transitory computer readable storage medium containing an executable program for displaying a world wide web page, where the executable program when executed by a processor, causes the processor to perform operations, the operations comprising:
   receiving the information from a user, wherein the information is to be displayed in the world wide web page, wherein the information includes a data feed from a source other than the user, wherein the information is received via a graphical user interface organized as a pre-architected world wide web page template;
   transforming the information into the world wide web page immediately upon completion of an entry of the information by the user, wherein the transforming imports the information into a template structure of the pre-architected world wide web page template; and
   displaying the world wide web page including the information to the user in a publishable form as the information is received, wherein the displaying is performed in real time, wherein the transforming and the displaying do not require an additional input from the user beyond the information that is received, wherein the publishable form provides a view of the world wide web page as finished, wherein the view of the world wide web page as finished comprises a view of the template structure of the pre-architected world wide web page template with fields of the pre-architected world wide web page template populated with the information, wherein the data feed from the source other that the user is continuously displayed in real time.

10. The non-transitory computer readable storage medium of claim 9, wherein the template is customized to a specification of the user.

11. The non-transitory computer readable storage medium of claim 9, wherein the template includes a hyperlink to a secondary world wide web page.

12. The non-transitory computer readable storage medium of claim 9, wherein the template structure is defined by the template.

13. An apparatus for displaying a world wide web page, the apparatus comprising:
   a processor; and
   a computer-readable medium storing a plurality of instructions which, when executed by the processor, cause the processor to perform operations, the operations comprising:
      receiving the information from a user, wherein the information is to be displayed in the world wide web page, wherein the information includes a data feed from a source other than the user, wherein the information is received via a graphical user interface organized as a pre-architected world wide web page template;
      transforming the information into the world wide web page immediately upon completion of an entry of the information by the user, wherein the processor is further configured to transform the information by importing the information into a template structure of the pre-architected world wide web page template; and
      displaying the world wide web page including the information to the user in a publishable form as the information is received, wherein the processor is further configured to display the information in the world wide web page in real time, wherein the transforming and the displaying do not require an additional input from the user beyond the information that is received, wherein the publishable form provides a view of the world wide web page as finished, wherein the view of the world wide web page as finished comprises a view of the template structure of the pre-architected world wide web page template with fields of the pre-architected world wide web page template populated with the information, wherein the data feed from the source other that the user is continuously displayed in real time.

14. The apparatus of claim 13, wherein the template structure is defined by the template.

* * * * *